United States Patent
Bilik et al.

(10) Patent No.: US 9,747,804 B1
(45) Date of Patent: Aug. 29, 2017

(54) OBJECT DETECTION-BASED DIRECTIONAL CONTROL OF LIGHT AND SOUND

(71) Applicant: GM Global Technology Operations LLC, Detroit, MI (US)

(72) Inventors: Igal Bilik, Rehovot (IL); Shahar Villeval, Tel Aviv (IL); Eli Tzirkel-Hancock, Ra'anana (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/190,401

(22) Filed: Jun. 23, 2016

(51) Int. Cl.
| | |
|---|---|
| B60Q 1/00 | (2006.01) |
| G08G 1/16 | (2006.01) |
| B60Q 5/00 | (2006.01) |
| B60Q 1/52 | (2006.01) |

(52) U.S. Cl.
CPC ............ *G08G 1/166* (2013.01); *B60Q 1/525* (2013.01); *B60Q 5/006* (2013.01)

(58) Field of Classification Search
CPC ........... G08G 1/116; B60Q 1/25; B60Q 5/006
USPC .................. 340/435, 436, 903; 701/300, 301
See application file for complete search history.

(56) References Cited

U.S. PATENT DOCUMENTS

| | | | | |
|---|---|---|---|---|
| 7,245,231 B2* | 7/2007 | Kiefer | ...................... | G08G 1/16 340/407.1 |
| 7,983,802 B2 | 7/2011 | Breed | | |
| 9,227,555 B2 | 1/2016 | Kalapodas | | |
| 9,230,178 B2 | 1/2016 | Toyofuku | | |
| 2004/0122573 A1* | 6/2004 | Mizutani | ................... | B60T 7/22 701/45 |
| 2005/0090950 A1* | 4/2005 | Sawamoto | ............. | G08G 1/166 701/23 |
| 2006/0164219 A1 | 7/2006 | Knoll | | |
| 2007/0219720 A1* | 9/2007 | Trepagnier | ............ | B60W 30/00 701/300 |
| 2010/0066516 A1* | 3/2010 | Matsukawa | ............... | B60R 1/00 340/435 |
| 2011/0010094 A1* | 1/2011 | Simon | .................... | B60W 30/16 701/301 |
| 2012/0078498 A1* | 3/2012 | Iwasaki | ................. | B60W 10/06 701/300 |
| 2012/0109415 A1* | 5/2012 | Nitta | ................... | B60T 8/17557 701/1 |

(Continued)

FOREIGN PATENT DOCUMENTS

| | | |
|---|---|---|
| JP | 7131574 A | 5/1995 |
| JP | 200567294 A | 3/2005 |

*Primary Examiner* — Ojiako Nwugo
(74) *Attorney, Agent, or Firm* — Cantor Colburn LLP

(57) ABSTRACT

A system and method perform object detection-based directional control of light transmission or sound transmission from a moving platform. The method includes receiving information about one or more objects that are proximate to the platform, and processing the information to obtain processed information, the processed information including a location of each of the one or more objects. Determining an importance and urgency among the one or more objects with regard to the light transmission or the sound transmission is based on the processed information. Controlling a light source or a sound source of the platform to respectively perform the light transmission or the sound transmission is based on the importance and the urgency.

14 Claims, 2 Drawing Sheets

(56) References Cited

U.S. PATENT DOCUMENTS

| | | | |
|---|---|---|---|
| 2012/0238296 A1* | 9/2012 | Nagai | H04W 4/021 455/456.4 |
| 2012/0296520 A1* | 11/2012 | Saito | B60Q 1/22 701/36 |
| 2013/0188794 A1* | 7/2013 | Kawamata | G01S 3/803 381/56 |
| 2014/0200799 A1* | 7/2014 | Sugano | B62D 15/027 701/301 |
| 2015/0015712 A1* | 1/2015 | Sempuku | G08G 1/165 348/148 |
| 2015/0127208 A1* | 5/2015 | Jecker | B62D 15/025 701/23 |
| 2015/0268338 A1 | 9/2015 | Freiburger et al. | |

* cited by examiner

OBJECT DETECTION-BASED DIRECTIONAL CONTROL OF LIGHT AND SOUND

FIELD OF THE INVENTION

The subject invention relates to vehicle detection and warning systems.

BACKGROUND

Vehicles are increasingly outfitted with detection, warning, and control systems. From long-standing systems, such as headlights and horns, to newly developed systems such as automatic obstacle detection and collision-avoidance controllers, these systems improve safety not only for the vehicle operator, but also for passengers and those around the vehicle. Information or a warning may be provided to the operator of the vehicle or by the vehicle to a pedestrian or other motorist outside the vehicle. For example, while vehicle headlights illuminate potential obstacles for the operator of the vehicle, a horn or other audio warning is provided to someone outside the vehicle. In multi-target scenarios, warnings may need to be prioritized based on a location of the target. Accordingly, it is desirable to provide object detection-based directional control of light and sound.

SUMMARY OF THE INVENTION

According to an exemplary embodiment, a method of performing object detection-based directional control of light transmission or sound transmission from a moving platform includes receiving information about one or more objects that are proximate to the platform; processing the information to obtain processed information, the processed information including a location of each of the one or more objects; determining an importance and urgency among the one or more objects with regard to the light transmission or the sound transmission based on the processed information; and controlling a light source or a sound source of the platform to respectively perform the light transmission or the sound transmission based on the importance and the urgency.

According to another exemplary embodiment, a system to perform object detection-based directional control of light transmission or sound transmission from a moving platform includes a light source configured to emit the light transmission; a sound source configured to emit the sound transmission; and a controller configured to receive information about one or more objects that are proximate to the platform, process the information to obtain processed information, the processed information including a location of each of the one or more objects, determine an importance and urgency among the one or more objects with regard to the light transmission or the sound transmission based on the processed information, and control the light source or the sound source to respectively perform the light transmission or the sound transmission based on the importance and the urgency.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
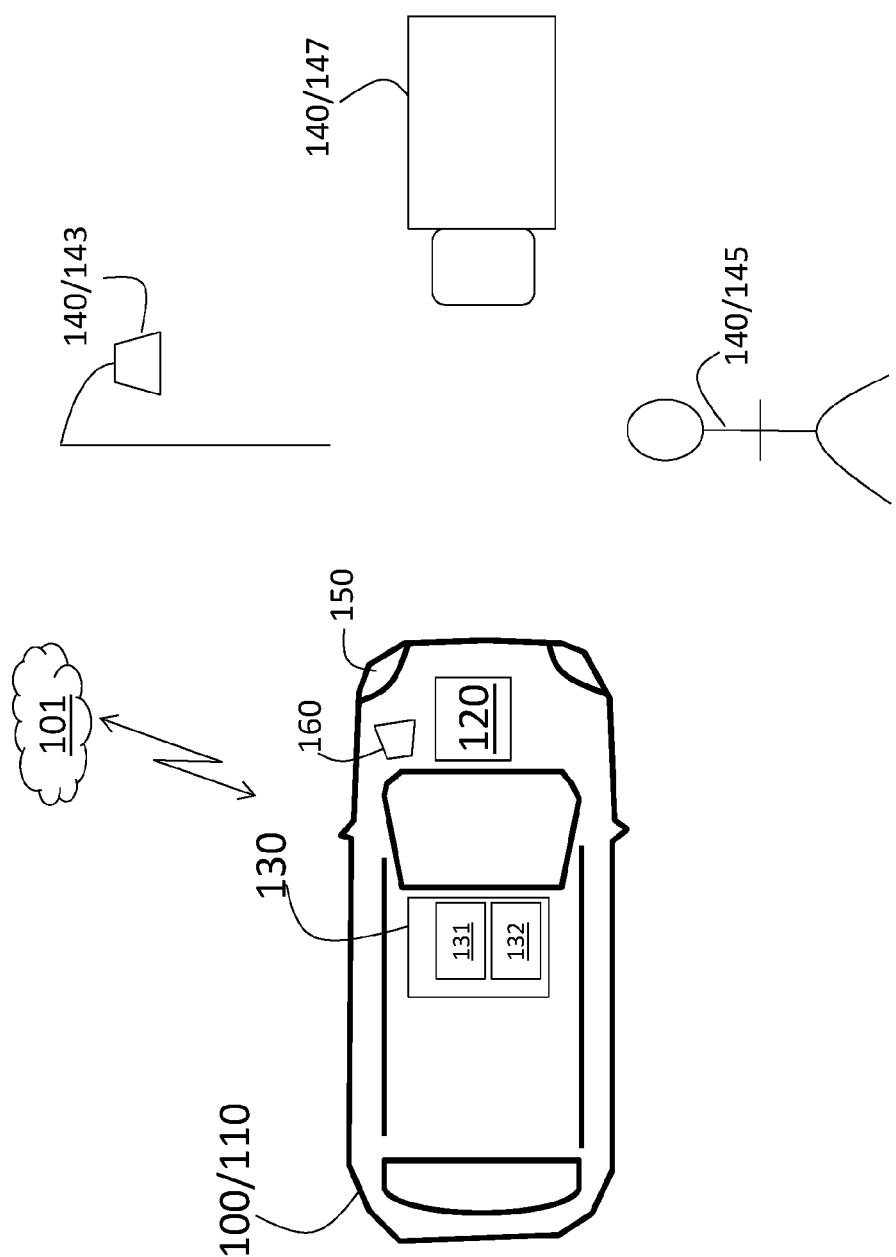
FIG. 1 is a block diagram of a platform with the objection detection-based directional control of light and sound according to one or more embodiments.

The following description is merely exemplary in nature and is not intended to limit the present disclosure, its application or uses. It should be understood that throughout the drawings, corresponding reference numerals indicate like or corresponding parts and features.

As previously noted, vehicle detection and warning systems include headlights and audio warnings (e.g., horns) or light beams and sound beams. Recently, adaptive headlights have been developed. These adaptive headlights cast the light beam in the direction of a curve to improve visibility on winding roads, for example. While the adaptive headlights adapt to road conditions, they fail to consider the location of objects (e.g., pedestrians, other vehicles) in directing the light beam. Embodiments of the systems and methods detailed herein relate to object detection-based directional control of light and sound. According to the one or more embodiments, target detection by a radar system or other detection system on the platform or information about target location provided to the platform is used to perform adaptive light beam and sound beam control.

In accordance with an exemplary embodiment of the invention, FIG. 1 is a block diagram of a platform 100 with the objection detection-based directional control of light and sound according to one or more embodiments. The exemplary platform 100 shown in FIG. 1 is a vehicle 110, but this example is only used for exemplary purposes. Alternate embodiments of the platform 100 include farm and construction equipment, moving platforms in automated manufacturing facilities, and trains, for example. The vehicle 110 includes a controller 120 to perform the object detection-based control of light and sound. An exemplary sound source 160 is shown as the vehicle horn, and the exemplary light source 150 is headlights comprised of light emitting diodes (LEDs). The vehicle 110 may include sensors 130 such as a radar system 131 or sound sensor 132. Other sensors 130 include a camera, lidar array, and global positioning sensor (GPS). These sensors 130 facilitate object detection or location determination.

The sensors 130 are well-known and are not detailed here. The radar system 131, for example, may be a multi-input multi-output (MIMO) radar with an array of transmit and receive elements. Over a series of transmissions, the MIMO radar array may facilitate determination of velocity, range, and direction of travel. The radar system 131 may transmit a sequence of pulses from each transmit element of the array according to a time divisional multiple access (TDMA) scheme. The radar system 131 may use a different linear frequency modulation continuous wave (LFM-CW) (chirp) transmission from each transmit element of the array to distinguish the transmissions. As another example, the sound sensor 132 may be a microphone, an array of microphones, or an ultrasound transducer. Ultrasonic sensors are used in vehicles for use during parking, for example. They detect the range to an object 140 and its movement. An array of microphones, too, may provide information about the location of an object 140 and, over time, a movement of the object 140.

The controller 120 is further detailed with reference to FIG. 2. The controller 120 includes processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 120 also includes components that perform communication over a network 101 with other platforms 100 or a central controller, for example. The communication by the controller 120 may augment information received from the radar system 131 or other sensors 130 of the platform 100 or may be used alone in alternate embodiments.

The controller 120 may use information from one or more sensors 130 and/or information from the network 101 to locate objects 140 and, specifically, locate the objects 140 relative to the vehicle 110. The objects 140 may be stationary objects 143 (e.g., lamp post) that may be considered in performing other control tasks such as collision avoidance, for example. The objects 140 may also be (relatively) slow-moving objects 145 such as pedestrians or small animals. The objects 140 may also be (relatively) fast-moving objects 147 such as other vehicles. As detailed herein, the controller 120 distinguishes the different objects 140 in determining whether and how the light source 150 and sound source 160 should be controlled. For example, objects 140 that are closer may be illuminated first by controlling the directionality of the light source 150. As another example, a pedestrian who is approaching the vehicle (e.g., in the middle of a street rather than at a crosswalk) may be warned with a directed sound source 160.

Figure 2:
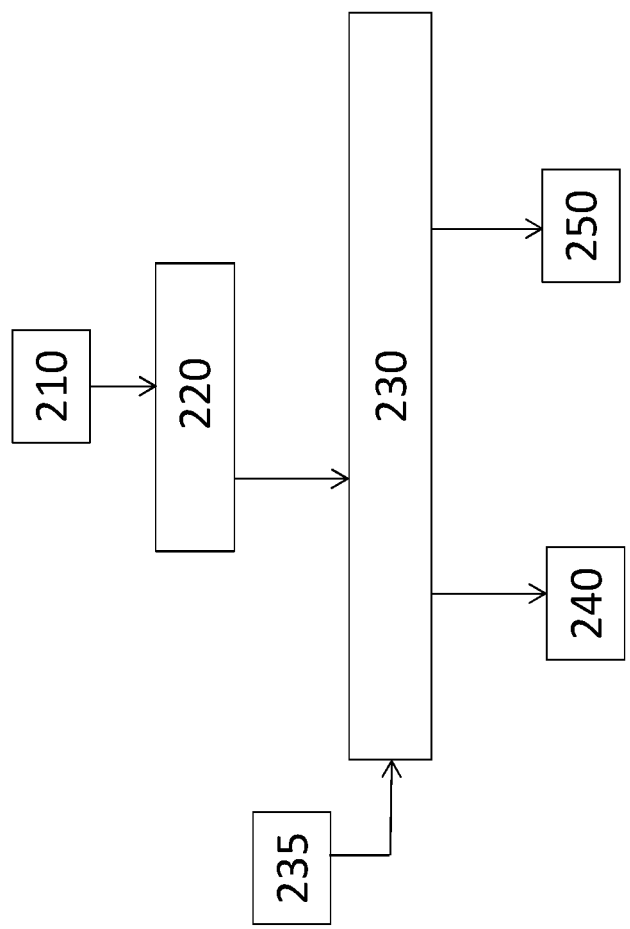
FIG. 2 is a process flow of a method of controlling directionality of one or both of the light source transmission and the sound source transmission according to one or more embodiments.

FIG. 2 is a process flow of a method of controlling directionality of one or both of the light source 150 transmission and the sound source 160 transmission according to one or more embodiments. The processes may be performed in part or entirely by the controller 120 on the platform 100. At block 210, the processes include receiving input information about objects 140. The information may be provided by an on-board detection system such as the radar system 131 or another sensor 130 of the platform 100. In alternate or additional embodiments, the information may be provided to the platform 100 via the network 101. Based on the source, the information may be different. For example, information from the radar system 131 may specifically indicate the location of each object 140 relative to the platform 100 as well as speed and direction of travel of the object 140. On the other hand, information from another sensor 130, such as a camera, for example, may be unprocessed. The information may be received periodically, continuously, or based on a trigger (e.g., as the platform 100 is approaching a known intersection).

Processing the information, at block 220, includes identifying one or more objects 140 based on the information. Identifying refers to categorizing the object 140 as a stationary object 143, slow-moving object 145 or fast-moving object 147. The categorizing may additionally or alternatively be based on location of the object 140 relative to the platform 100 and direction of travel of the object 140 relative to the platform 100. This type of identification may aid in determining urgency, as discussed below. Identifying also refers to differentiating the type of object 140 as a person or animal, for example. This type of identification may aid in determining importance, as discussed below. Based on the information received (at block 210), one or more types of identification may not be possible. Categorizing the object 140 based on parameters such as speed, for example, may be straight-forward. This is because the information may be received at block 210. When such information is not provided (at block 210), the processing may include estimating speed of an object 140 based on location information about the object 140 over a period of time or at different times.

Categorizing the object 140 as a particular type (e.g., vehicle, pedestrian, animal) may also be straight forward. For example, such information may be received from a sensor 130 that includes a camera and an image processor. When such information is not provided (at block 210), the speed or movement may be analyzed to make such a determination. According to alternate or additional embodiments, the sound sensor 132 may provide information that facilitates determining a type of the object 140. This category may be deemed irrelevant or may be weighted less than the categorization based on speed to ensure that a false identification is not made. Such a weighting determination may be based on speed of the platform 100, for example. That is, when the platform 100 is moving above a threshold speed, the opportunity to obtain and analyze information to estimate the type of object 140 may be less and, thus, may be omitted or weighted less.

Determining importance and urgency of objects 140, at block 230, is based on the processing at block 220. The determination (at block 230) may be separate with regard to the light source 150 and the sound source 160. Further, other information (from block 235) may be used in this regard. The other information (at block 235) includes information about the ambient light. When the level of ambient light is high (e.g., it is sunny), the importance and urgency assigned to any object 140 with regard to the light source 150 may be low or not at all (i.e., importance and urgency may not be considered with regard to the light source 150). When the level of ambient light is low, the importance and urgency assigned to an object 140 with regard to the light source 150 and the sound source 160 may be the same. On the other hand, when the level of ambient light is low, an object 140 that is near a stationary object 143 that is identified as a light post may be assigned a lower urgency with regard to the light source 150 but not necessarily the sound source 160. As noted previously, the speed for the platform 100 may determine the opportunity to obtain and analyze data in time to identify objects 140 and make additional adaptive decisions. When a speed of the platform 100 exceeds the threshold speed, for example, only two modes may be used: determination of importance and urgency are the same for the light source 150 and sound source 160 based on low ambient light information (at block 235) or the sound source 160 is the focus based on high ambient light information (at block 235).

As noted, determining the urgency and importance of an object 140 (at block 230) may be based on different determinations. Relative importance may be used to override an urgency determination. That is, if a pedestrian and an animal are both approaching the platform 100 from different directions, the pedestrian and the animal may be assigned an equal urgency but a different importance with respect to directing the sound source 160, for example.

Urgency of an object 140 may be based on identifying the object 140 as a stationary object 143, slow-moving object 145 or fast-moving object 147. Fast-moving objects 147 may be more urgent than slow-moving objects 145, and both fast-moving objects 147 and slow-moving objects 145 may be more urgent than stationary objects 143 according to established rules. According to an alternate embodiment, location or direction of travel may be considered in determining urgency. More than one parameter may be considered and weighted differently. For example, speed of the object 140 may result in a particular urgency score but that score may be weighted less than an urgency score determined for that same object 140 based on its location or direction of travel. The overall urgency of an object 140 may be quantified based on the overall weighted scores. The rules that affect the parameters that are considered in determining urgency and the relative weighting of the parameters may be modified based on triggers (e.g., based on the area in which the platform 100 is or on the speed of the platform 100) or by an operator of the platform 100.

As also noted, importance of an object 140 may be determined (at block 230) based on identifying the type of the object 140. Like urgency, importance may be determined based on a relative weighting of more than one parameter. Further, the parameters or their relative weighting may be modified based on triggers or an operator of the platform 100.

Controlling the light source 150, at block 240, and controlling the sound source 160, at block 250, is based on the determination (at block 230) of relative urgency and importance. As previously noted, the determination of importance may act to override the determination of urgency. The relative weighting on an urgency score or importance score may be modified based on triggers (e.g., speed of the platform 100) or by the operator of the platform 100. Thus, for example, when the platform 100 is travelling over a threshold speed, the determination of importance may be weighted less and the most urgent object 140 may be addressed by directing the light source 150 and the sound source 160 to that object 140.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of performing object detection-based directional control of light transmission or sound transmission from a moving platform, the method comprising:
   receiving information about one or more objects that are proximate to the platform;
   processing the information to obtain processed information, the processed information including a location of each of the one or more objects;
   determining an importance and urgency among the one or more objects with regard to the light transmission or the sound transmission based on the processed information; and
   controlling a light source or a sound source of the platform to respectively perform the light transmission or the sound transmission based on the importance and the urgency, wherein the determining the importance is based on a first set of one or more parameters of the processed information and the determining the urgency is based on a second set of one or more parameters of the processed information and the determining the importance includes obtaining a quantitative value based on a weighted score assigned to each of the first set of one or more parameters associated with each of the one or more objects, and the determining the urgency includes obtaining a quantitative value based on a weighted score assigned to each of the second set of one or more parameters associated with each of the one or more objects.

2. The method according to claim 1, wherein the receiving the information includes receiving the information from a radar system on the platform.

3. The method according to claim 1, wherein the receiving the information includes receiving the information from a sound sensor.

4. The method according to claim 1, wherein the receiving the information includes receiving the information from a camera or lidar system on the platform.

5. The method according to claim 1, wherein the receiving the information includes receiving the information from outside the platform.

6. The method according to claim 1, wherein the processing the information includes determining at least one of a type, direction of travel, or speed of the one or more objects.

7. The method according to claim 1, wherein the importance and the urgency associated with the light source is different than the importance and the urgency associated with the sound source based on an ambient light level.

8. A system to perform object detection-based directional control of light transmission or sound transmission from a moving platform, the system comprising:
   a light source configured to emit the light transmission;
   a sound source configured to emit the sound transmission; and
   a controller configured to receive information about one or more objects that are proximate to the platform, process the information to obtain processed information, the processed information including a location of each of the one or more objects, determine an importance and urgency among the one or more objects with regard to the light transmission or the sound transmission based on the processed information, and control the light source or the sound source to respectively perform the light transmission or the sound transmission based on the importance and the urgency, wherein the controller determines the importance based on a first set of one or more parameters of the processed information and determines the urgency based on a second set of one or more parameters of the processed information and the controller determines the importance based on obtaining a quantitative value based on a weighted score assigned to each of the first set of one or more parameters associated with each of the one or more objects and determines the urgency based on obtaining a quantitative value based on a weighted score assigned to each of the second set of one or more parameters associated with each of the one or more objects.

9. The system according to claim 8, wherein the controller receives the information from a radar system on the platform.

10. The system according to claim 8, wherein the controller receives the information from a sound sensor on the platform.

11. The system according to claim 8, wherein the controller receives the information from a camera or lidar system on the platform.

12. The system according to claim 8, wherein the controller receives the information from outside the platform.

13. The system according to claim 8, wherein the controller processes the information to determine at least one of a type, direction of travel, or speed of the one or more objects.

14. The system according to claim 8, wherein the importance and the urgency associated with the light source is different than the importance and the urgency associated with the sound source based on an ambient light level.

* * * * *